(12) United States Patent
Wang

(10) Patent No.: US 11,677,122 B2
(45) Date of Patent: Jun. 13, 2023

(54) BATTERY PACK

(71) Applicant: Contemporary Amperex Technology Co., Limited, Ningde (CN)

(72) Inventor: Xu Wang, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 124 days.

(21) Appl. No.: 17/504,487

(22) Filed: Oct. 18, 2021

(65) Prior Publication Data

US 2022/0037745 A1     Feb. 3, 2022

Related U.S. Application Data

(63) Continuation of application No. PCT/CN2020/081741, filed on Mar. 27, 2020.

(30) Foreign Application Priority Data

Apr. 19, 2019   (CN) .......................... 201920536836.1

(51) Int. Cl.
*H01M 50/528*   (2021.01)
*H01M 50/519*   (2021.01)
*H01M 50/209*   (2021.01)
*H01M 50/543*   (2021.01)

(52) U.S. Cl.
CPC ....... *H01M 50/528* (2021.01); *H01M 50/209* (2021.01); *H01M 50/519* (2021.01); *H01M 50/543* (2021.01); *H01M 2220/20* (2013.01)

(58) Field of Classification Search
CPC ............. H01M 50/528; H01M 50/519; H01M 50/209; H01M 50/543; H01M 2220/20
See application file for complete search history.

(56) References Cited

U.S. PATENT DOCUMENTS

2016/0308344 A1   10/2016   Brisbane et al.

FOREIGN PATENT DOCUMENTS

| CN | 105932188 A | 9/2016 |
|---|---|---|
| CN | 208400927 U | 1/2019 |
| CN | 208460867 U | 2/2019 |
| CN | 208674174 U | 3/2019 |
| CN | 209496933 U | 10/2019 |
| JP | 2017117574 A | 6/2017 |

OTHER PUBLICATIONS

The International search report for PCT Application No. PCT/CN2020/081741, dated Jul. 1, 2020, 13 pages.
The extended European search report for EP Application No. 20790693.4, dated Mar. 23, 2022, 8 pages.
The First Examination Report for EP Application No. 20790693.4, dated Jul. 21, 2022, 4 pages.

*Primary Examiner* — Jane J Rhee
(74) *Attorney, Agent, or Firm* — East IP P.C.

(57) ABSTRACT

The present application relates to a technical filed of energy storage devices, and particularly relates to a battery pack. The battery pack includes: a plurality of battery modules, in which each battery module includes a plurality of unit batteries electrically connected to each other, and output electrodes are arranged at joints of each of the battery modules in a height direction and in a length direction; a flexible electrical connection member, electrically connected to the output electrode, and arranged at an end of the battery module in the length direction; a fixing member, arranged on an outside of the flexible electrical connection member to fix the flexible electrical connection member on the battery module.

16 Claims, 9 Drawing Sheets

BATTERY PACK

CROSS REFERENCE TO RELATED APPLICATION

The present application is a continuation of International Application No. PCT/CN2020/081741, filed on Mar. 27, 2020, which claims priority to Chinese Patent Application No. 201920536836.1, filed on Apr. 19, 2019, titled "BATTERY PACK", both of which are hereby incorporated by reference in their entireties.

TECHNICAL FIELD

The present application relates to a technical filed of energy storage devices, and particularly relates to a battery pack.

BACKGROUND

As the energy density of power batteries continues to increase, and at the same time, facing the diverse requirements of different customers, an internal structure of a battery pack is complex and needs to adapt to different application scenarios and requirements with the help of the flexibility of a flexible electrical connection member.

However, due to the poor rigidity of the flexible electrical connection member, it is difficult to maintain the original design shape in the case that the flexible electrical connection member is subjected to vibration or other external forces, that is, the flexible electrical connection member may interfere with other components due to the force and deformation, cause a serious consequence like a short circuit, and even cause an irreversible damage to the matching counterpart, resulting in the connection failure.

Due to the above requirements and abnormal situations, there is an urgent need to design a new type of battery module to solve the above problems.

SUMMARY

A battery pack is provided by the present application, which can solve the problem of easy deformation of a current flexible electrical connection member.

A battery pack provided by the present application includes:

a plurality of battery modules, in which each battery module includes a plurality of unit batteries electrically connected to each other, and output electrodes are arranged at joints of each of the battery modules in a height direction (Z) and in a length direction (X);

a flexible electrical connection member, electrically connected to the output electrode, and arranged at an end of the battery module in the length direction (X);

a fixing member, arranged on an outside of the flexible electrical connection member to fix the flexible electrical connection member on the battery module.

According to one aspect of the present application, the fixing member is arranged on the outside of the flexible electrical connection member in a first height direction (Z1) and on an outside of the output electrode in the length direction (X).

According to one aspect of the present application, the fixing member includes a first fixing portion, the first fixing portion includes a cavity, and the cavity is configured to accommodate a part of the flexible electrical connection member.

According to one aspect of the present application, the first fixing portion is provided with a hook;

the battery module is wrapped by a cable tie, and the hook is insertedly connected to the cable tie; or an end plate is arranged at the end of the battery module in the length direction (X), and the hook is inserted and connected to the end plate.

According to one aspect of the present application, the first fixing portion includes a first hooking portion and a second hooking portion, and the first hooking portion snappedly engages with the second hooking portion.

According to one aspect of the present application, the fixing member further includes a second fixing portion connected to the first fixing portion;

first baffles are respectively arranged below two sides of the second fixing portion in a width direction (Y), and the first baffles are arranged on an outside of the output electrode in the width direction (Y).

According to one aspect of the present application, a second baffle is connected to ends of the two first baffles in the length direction (X);

an accommodating cavity is enclosed by the first baffles and the second baffle, and the accommodating cavity is arranged above the output electrode in the length direction (X).

According to one aspect of the present application, the fixing member further includes a third fixing portion, and the third fixing portion is connected to each of the first fixing portion and the second fixing portion;

the third fixing portion is arranged on an outside of an end of the flexible electrical connection member in the first height direction (Z1) and on an outside of an end of the output electrode in the length direction (X).

According to one aspect of the present application, the third fixing portion includes a curved portion, or the third fixing portion includes a flat portion and a curved portion.

According to one aspect of the present application, the first fixing portion, the second fixing portion and the third fixing portion are integrally formed by injection molding.

In another aspect, a vehicle provided by the present application includes the battery pack as described above.

Beneficial Effects in the present application, the fixing member can fix the flexible electrical connection member on the battery module by means of arranging the fixing member on the outside of the flexible electrical connection member. Thus, the reliable fixing of the flexible electrical connection member can be realized, and the deformation of the flexible electrical connection member can be limited, so that the problem of easy deformation of the current flexible electrical connection member and insulation failure caused by the deformation can be solved.

It should be understood that the above general description and the following detailed description are only exemplary and cannot limit the present application.

Figure 1:
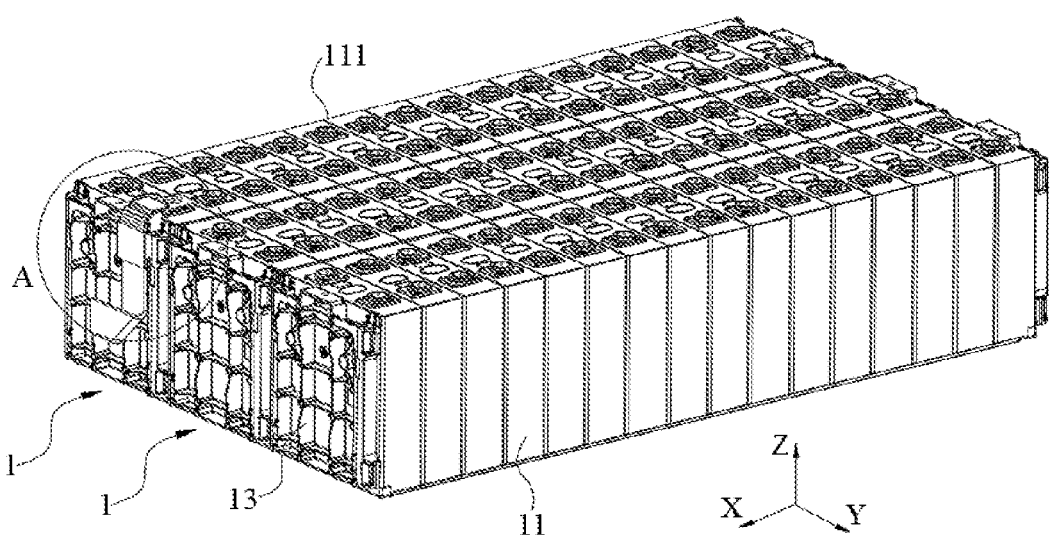
FIG. 1 shows a structural schematic view of a battery module according to embodiment I of the present application.

In the drawings:
1—battery module;
11—unit battery;
111—terminal;
12—output electrode;
121—output electrode base;
13—end plate;
2—flexible electrical connection member;
3—fixing member;
30—cavity;
31—first fixing portion;
311—hook;
312—first hooking portion;
313—second hooking portion;
314—side plate;
315—front plate;
316—back plate;
32—second fixing portion;
321—first baffle;
322—second baffle;
323—accommodating cavity;
33—third fixing portion;
331—curved portion;
331a—crease;
332—flat portion.

The drawings here are incorporated into the description and constitute a part of the description, show the embodiments that conform to the present application, and are used to explain the principle of the present application together with the description.

DETAILED DESCRIPTION

In order to make the objects, the features and the advantages of the present application more apparent, the present application will be described in details hereinafter in conjunction with the drawings and embodiments. It should be understood that the specific embodiments described here are only used to explain the present application, and are not used to limit the present application.

It shall be noted that, in this context, the terms "first" and "second" are merely used for the purpose of description, and cannot be understood as indicating or implying relative importance; unless otherwise specified or stated, the meaning of the term "plurality" is two or more; the terms "connection", "fixing" and the like should be understood broadly, and may be, for example, the "connection" may be a fixed connection, a detachable connection, an integral connection, or an electrical connection; and may be a direct connection or an indirect connection via an intermediate medium. The specific meaning of the above terms in the present application can be understood by the person skilled in the art according to actual circumstance.

It should be understood that, in the description of the present application, the directional words such as "upper" and "lower" described in the embodiments of the present application are described from the angle shown in the drawings, and should not be construed as limiting the embodiments of the present application. In addition, in the context, it should also be understood that when it is mentioned that an element is connected "on" or "under" another element, it can not only be directly connected "on" or "under" the other element, but can also be indirectly connected "on" or "under" the other element through an intermediate element.

As shown in FIG. 1, a battery pack is provided by embodiment I of the present application. The battery pack can be used as a power source for an electric device (such as an electric vehicle). The battery pack includes a plurality of battery modules 1 stacked in a width direction (Y); each battery module 1 includes a plurality of unit batteries 11 stacked in a length direction (X); the plurality of unit batteries 11 in the same battery module 1 electrically connected to one another, that is, the plurality of unit batteries 11 are connected in parallel and/or in series to form the battery module 1. Each of the unit batteries 11 is provided with two terminals 111 having opposite polarities; after the plurality of unit batteries 11 are connected in parallel and/or in series, a positive output terminal and a negative output terminal are formed in each battery module 1; output electrodes 12 are electrically connected to the positive output terminal and the negative output terminal, respectively (FIG. 1 and FIG. 2 show a case where only one output electrode 12 is connected to the positive output terminal (or connected to the negative output terminal)), so that each of the unit batteries 11 can be electrically connected to an external device.

Figure 2:
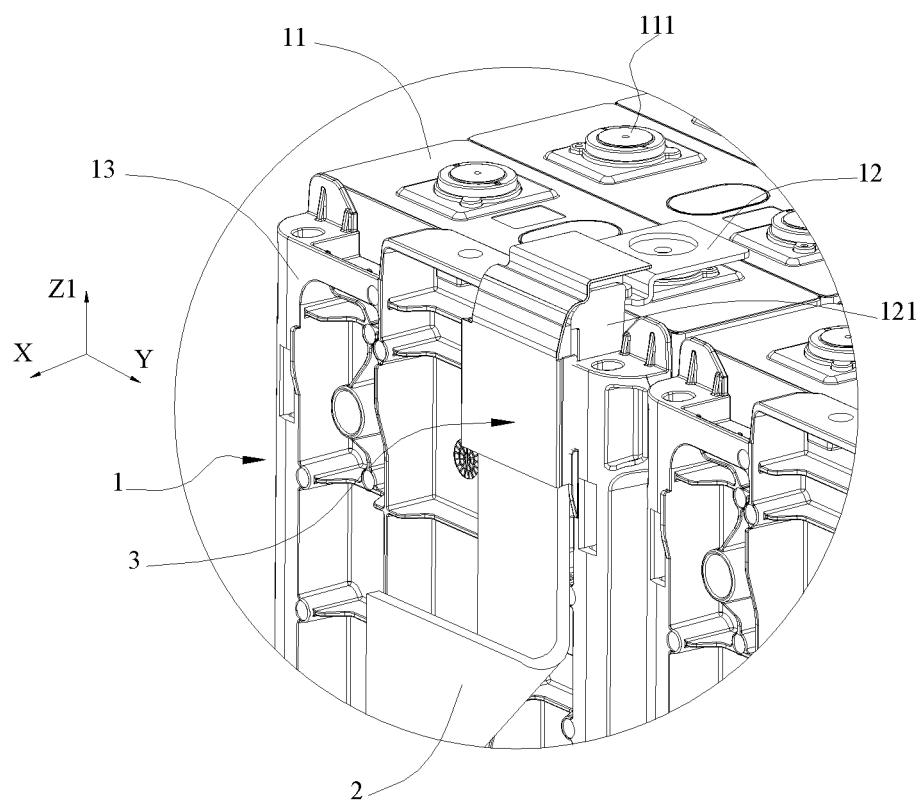
FIG. 2 shows an enlarged schematic view of a portion A as shown in FIG. 1.

Referring to FIG. 2, FIG. 2 shows an enlarged schematic view of a portion A as shown in FIG. 1. The above-mentioned battery pack also includes a flexible electrical connection member 2. The flexible electrical connection member 2 is electrically connected to the output electrode 12, for example, by ultrasonic welding, or by fixing ends of the flexible electrical connection member 2 and the output electrode 12 through a screw or a bolt, etc., so as to transmit the electric energy of each unit battery 11 by the flexible electrical connection member 2. The flexible electrical connection member 2 may be a flexible circuit board or a flexible wire harness, which is not limited in the present application, as long as the flexible electrical connection member 2 can transmit the electric energy of each unit battery 11. The flexible electrical connection member 2 is arranged at an end of the battery module 1 in the length direction (X), and the output electrodes are arranged at joints of each battery module in a height direction (Z) and in a length direction (X). A fixing member 3 is arranged on an outside of the flexible electric connection member 2 to fix the flexible electric connection member 2 on the battery module 1, thereby realizing reliable fixing of the flexible electric connection member 2, limiting deformation of the flexible electric connection member 2 and reducing a risk of short circuit.

Figure 3:
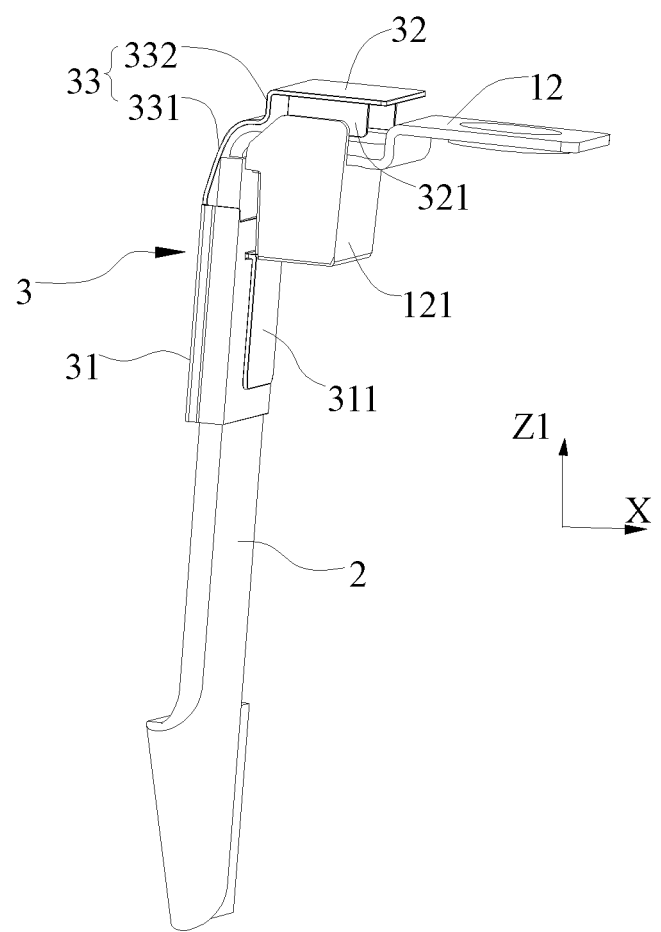
FIG. 3 shows a structural schematic view of a fixing member, a flexible electrical connection member, an output electrode and an output electrode base as shown in FIG. 2.

Further, referring to FIG. 2 and FIG. 3, the fixing member 3 is arranged on the outside of the flexible electrical connection member 2 in a first height direction (Z1) and on an outside of the output electrode 12 in the length direction (X)

(the first height direction is an upward pointing direction as shown in FIGS. 2 and 3) Thus, a situation that the flexible electrical connection member 2 and the output electrode 12 may be in contact with other electrical conductors due to the influence of an external force can be prevented, which is beneficial to improving the safety of electrical performance. The "outside" can be understood as follows: an inside wall of the fixing member 3 is in contact with or not in contact with the outside surface of the flexible electrical connection member 2 and the output electrode 12, as long as the flexible electrical connection member 2 and the output electrode 12 can be restricted to an inside of the fixing member 3.

Specifically, the fixing member 3 is made of an insulating polymer material. Preferably, the insulating polymer material may be PP (polypropylene), PET (Polyethyleneterephthalate), ABS (terpolymer of acrylonitrile, butadiene and styrene) or the like. Since the outside of the flexible electrical connection member 2 is sheathed with a heat-shrinkable tube, the heat-shrinkable tube is usually made of PVC (Polyvinylchloride) material, and an abrasion resistance of the above three insulating polymer materials is better than that of PVC, which is beneficial to preventing the flexible electrical connection member 2 from being abraded with other electrical conductors to cause insulation failure.

Further, an end plate 13 is arranged at the end of each battery module 1 in the length direction (X); a cable tie is wrapped around the battery module 1 (not shown in the drawings); the cable tie is configured to bind one or more battery modules 1. In order to increase the binding effect, a slot for accommodating the cable tie can be arranged on the end plate 13. Specifically, the fixing member 3 is provided with a hook 311, and the hook 311 is configured to be inserted and connected with the cable tie, so that the fixing member 3 can be fixed on the end of the battery module 1 in the length direction (X). Compared with the conventional welding method, the way in which the hook 311 is inserted and connected with the cable tie in the present application is more convenient, and a design structure of the hook 311 is also simpler. It should be understood that the fixing member 3 can also be cooperated and connected with the end plate 13, for example, a plug-connected position for plugging and connecting the hook 311 is arranged on the end plate 13.

Figure 4:
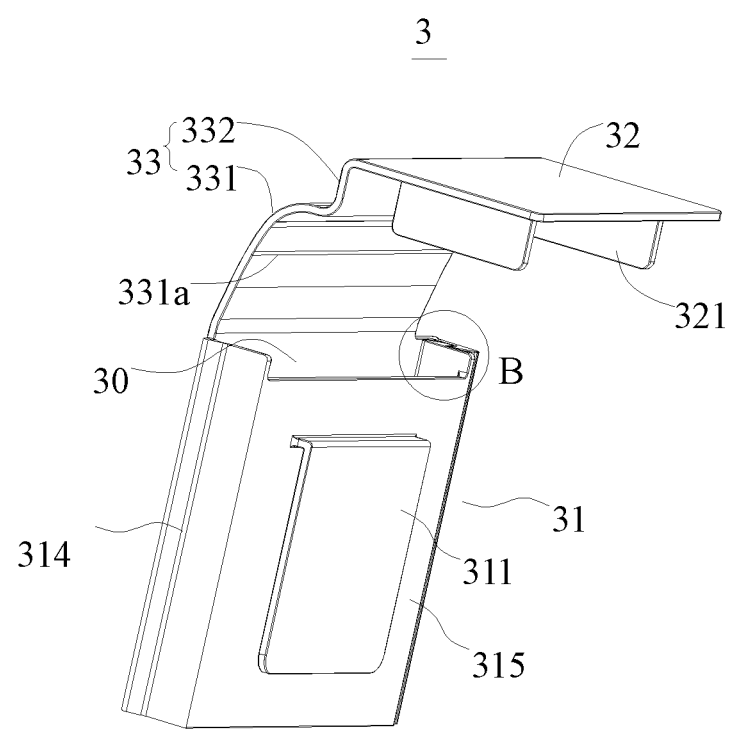
FIG. 4 shows a structure schematic view of the fixing member as shown in FIG. 3.

Further, referring to FIG. 4, FIG. 4 shows a structure schematic view of the fixing member 3 provided by embodiment I of the present application. The fixing member 3 includes a first fixing portion 31, the first fixing portion 31 includes a cavity 30, and the cavity 30 can accommodate a part of the flexible electrical connection member 2, thereby realizing the fixing and position restricting of the flexible electrical connection member 2, so as to protect it from deformation by the external force. The cavity 30 of the present application serves to wrap the flexible electrical connection member 2. It should be understood that the cavity 30 may also be a semi-enclosed structure, so that an end of the flexible electrical connection member 2 in the height direction (Z) is fixed to the battery module 1. In addition, the hook 311 is arranged on the first fixing portion 31, optionally, arranged in a direction of the first fixing portion 31 facing the cable tie, so that after the first fixing portion 31 is enclosed to form the cavity 30 from an unfolded state, it is more convenient for the hook 311 to be inserted and connected with the cable tie.

Figure 5:
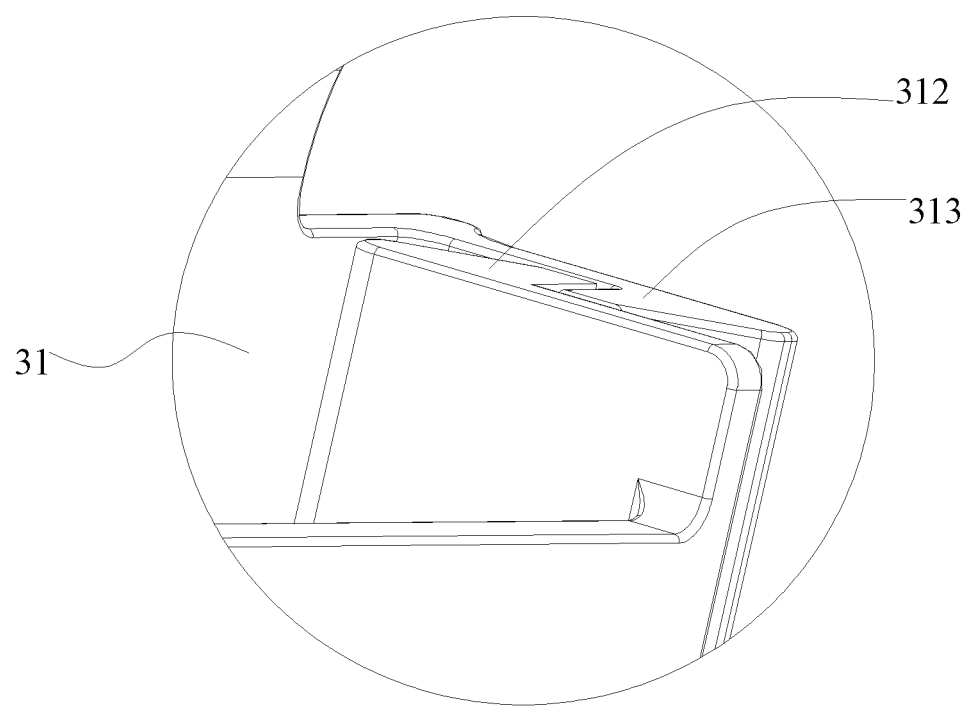
FIG. 5 shows an enlarged schematic view of B as shown in FIG. 4.

Further, the first fixing portion 31 includes two side plates 314, a front plate 315 and a back plate 316; the hook 311 is arranged on the front plate 315. The cavity 30 includes an opening-closing position, and the cavity 30 can be opened or closed by the opening-closing position. The opening-closing position of the cavity 30 is arranged on one of the side plates 314. Referring to FIG. 5, the side plate 314 includes a first hooking portion 312 and a second hooking portion 313; after the first hooking portion 312 snappedly engages with the second hooking portion 313, the first fixing portion 31 is enclosed to form the cavity 30. Each of the first hooking portion 312 and the second hooking portion 313 provided by the present application is hook-like structures, which is more convenient for the clamping between the first hooking portion 312 and the second hooking portion 313 (an unfolded state of the first fixing portion 1 can be seen in FIG. 6). It should be understood that the first hooking portion 312 and the second hooking portion 313 may also be other clamping structures, for example, a structure in which a groove and a protrusion cooperate with each other, which is not specifically limited in the present application. At the same time, the number of the above-mentioned clamping structure is not limited to one, and can also be two, which is not specifically limited in the present application.

Further, the fixing member 3 further includes a second fixing portion 32 connected to the first fixing portion 31; first baffles 321 are respectively arranged below two sides of the second fixing portion 32 in the width direction (Y), the first baffle 321 abuts against an output electrode base 121 of the unit battery 11 (see FIG. 3); and the first baffle 321 is arranged on an outside of the output electrode 12 in the width direction (Y); so that the isolation and protection of the output electrode 12 can be achieved by cooperating with a position of the output electrode base 121. In addition, since the fixing portion 3 is made of an insulating material, it can prevent the output electrode 12 from contacting other electrical conductors due to exposing the output electrode 12 when the fixing portion 3 is deformed by force, and at the same time, a creepage distance between the output electrode 12 and other electrical conductors is greatly improved, which is beneficial to improving the safety and the electrical performance of the output electrode 12.

Figure 9:
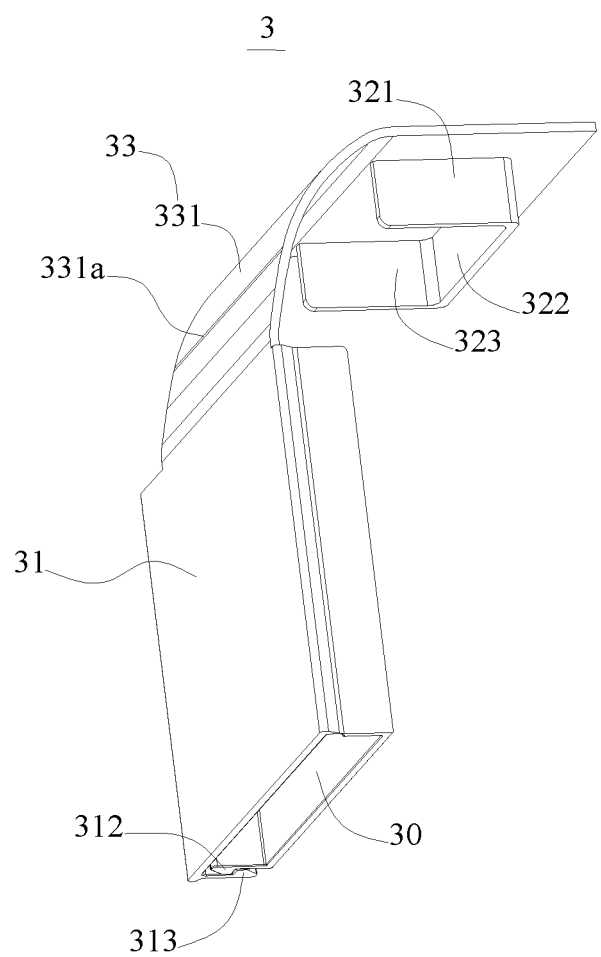
FIG. 9 shows a structural schematic view of a fixing member according to embodiment IV of the present application.

In another embodiment, referring to FIG. 9, a second baffle 322 are connected to ends of the two first baffles 321 in the length direction (X), an accommodating cavity 323 is enclosed by the first baffles 321 and the second baffle 322, and the accommodating cavity 323 is arranged above the output electrode 12 in the length direction (X). Compared with the first baffles 321 provided on both sides in the width direction (Y), the accommodating cavity 323 can better insulate and protect the output electrode 12, so as to prevent the output electrode 12 from contacting other electrical conductors or the insulation failure due to insufficient electrical clearance or other reasons.

Further, the fixing member 3 further includes a third fixing portion 33, and the third fixing portion 33 is connected to the first fixing portion 31 and the second fixing portion 32; the third fixing portion 33 is arranged on an outside of an end of the flexible electrical connection member 2 in the first height direction (Z1) and on an outside of an end of the output electrode 12 in the length direction (X) (i.e. an outside of a connection and cooperation position between the flexible electrical connection member 2 in the first height direction (Z1) and the output electrode 12 in the length direction (X)). Due to the limitation of safety conditions, an insulator for isolation cannot be provided at an end face of the flexible electrical connection member 2 connecting and cooperating the output electrode 12, so that the flexible electrical connection member 2 itself has a large area of the electrical conductor exposed around the connection and cooperation position. The third fixing portion 33 protects the connection and cooperation position, so that it can effectively isolate the position from other electrical conductors.

Figure 6:
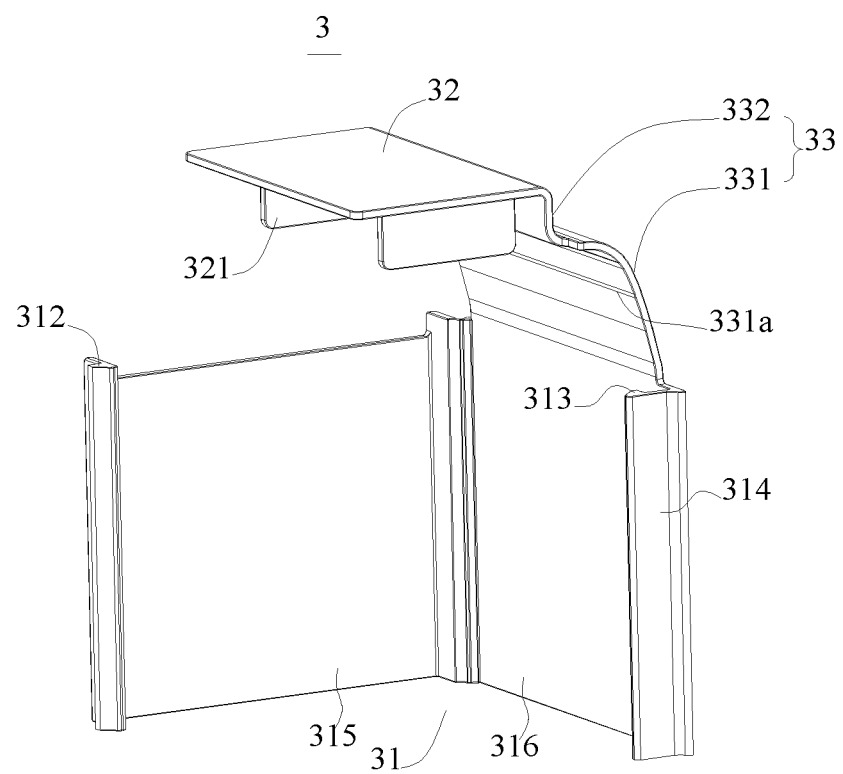
FIG. 6 shows a structural schematic view of the fixing member in an unfolded state as shown in FIG. 4.
Figure 7:
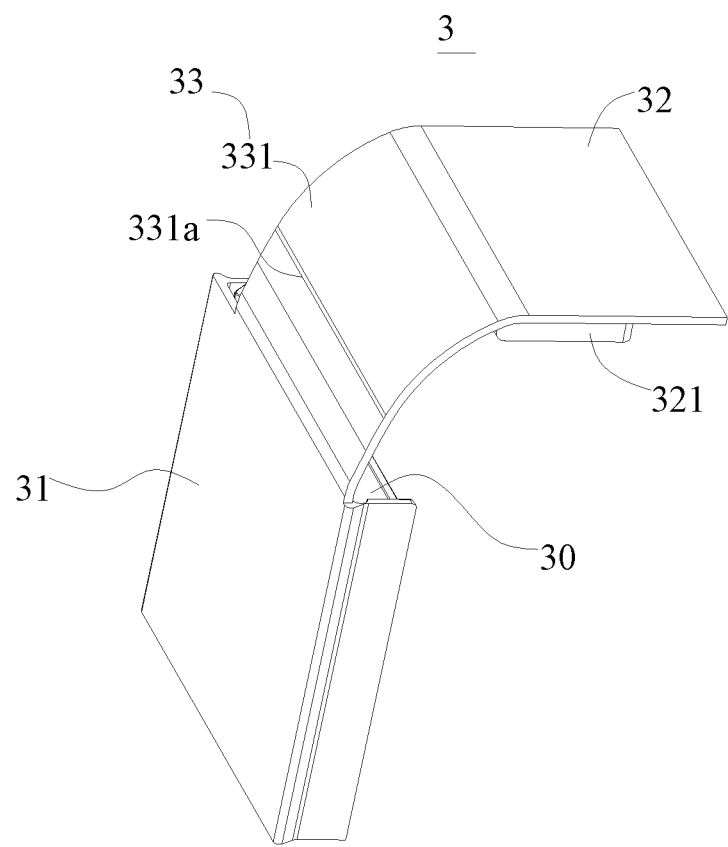
FIG. 7 shows a structural schematic view of a fixing member according to embodiment II of the present application.
Figure 8:
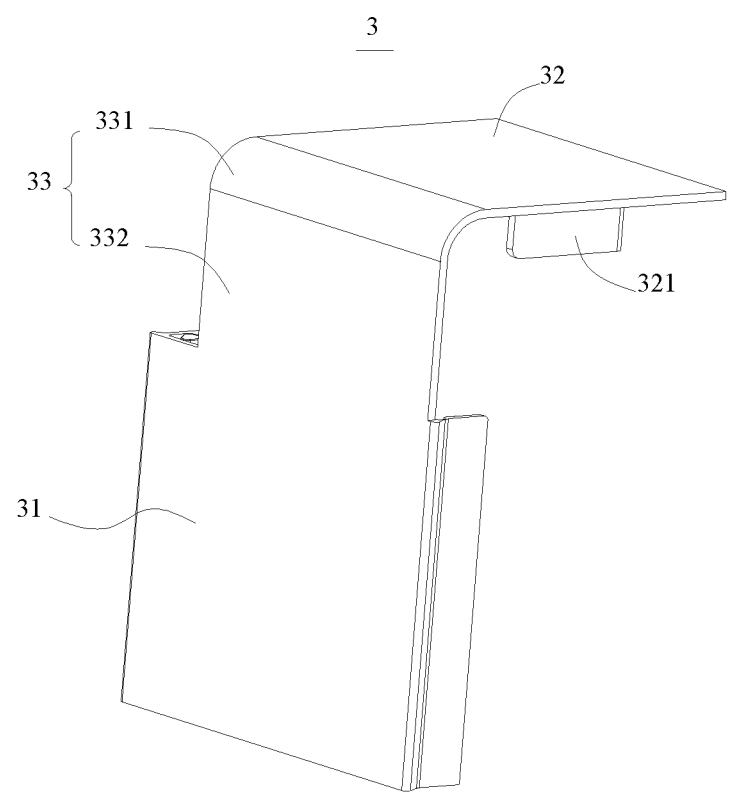
FIG. 8 shows a structural schematic view of a fixing member according to embodiment III of the present application.

Specifically, the third fixing portion 33 in FIGS. 7 and 9 only includes a curved portion 331, while the third fixing portion 33 in FIGS. 6 and 8 includes the curved portion 331 and a flat portion 332. The specific structure of the third fixing portion 33 can be designed according to different applications. Due to space constraints, a top of the output electrode 12 is usually a rigid electrical conductor, and the flexible electrical connection member 2 is easily in contact with the output electrode 12 or even wears out, resulting in the insulation failure. In the present application, the third fixing portion 33 is provided for insulation and isolation, which can further improve an electrical connection reliability of the flexible electrical connection member 2. Particularly, the curved portion 331 as described above includes a plurality of creases 331a, and the curved portion 331 with different curvatures can be formed by providing a plurality of creases 331a, or the third fixing portion 33 with different lengths can be formed by providing the plurality of creases 331a, so as to be suitable for different applications. In addition, the flat portion 332 shown as FIGS. 6 and 8 has different design lengths (the flat portion 332 in FIG. 8 is longer than the flat portion 332 in FIG. 6), so that the third fixing portion 33 can also be adapted to the design requirements of different applications.

Specifically, the fixing member 3 provided by the above embodiments of the present application is a structure integrally formed by injection molding, which can increase the processing efficiency of the fixing member 3 and reduce the processing cost of the fixing member 3. It should be pointed out that the third fixing portion 33 of the present application may not include the plurality of creases 331a, instead, the fixing member 3 integrally formed by injection molding itself includes the third fixing portion 33 that can be bendable, that is, the third fixing portion 33 of the fixing member 3 formed by injection molding is flexible.

As described above, the fixing member 3 provided by the present application has the function of fixing the flexible electrical connection member 2, insulating and isolating, and at the same time, it also has the function of protecting the output electrode 12 to be insulated and isolated. Compared with a commonly used insulation structure, the function of fixing and limiting the deformation of the flexible electrical connection member 2 and protecting the output electrode 12 in the present application can be integrated, which can reduce the number of parts, improve the assembly efficiency, and greatly reduce the cost.

The above descriptions are only the preferred embodiments of the present application, and are not used to limit the present application. For those skilled in the art, the present application may have various modifications and changes. Any modification, equivalent replacement, improvement, etc. made within the spirit and principle of the present application should be included in the protection scope of the present application.

What is claimed is:
1. A battery pack, comprising:
   a plurality of battery modules, wherein each of the battery modules comprises a plurality of unit batteries electrically connected to one another, and output electrodes are arranged at joints of each of the battery modules in a height direction and in a length direction;
   a flexible electrical connection member, electrically connected to the output electrode, and arranged at an end of the battery module in the length direction;
   a fixing member, arranged on an outside of the flexible electrical connection member to fix the flexible electrical connection member on the battery module;
   wherein the fixing member comprises a first fixing portion, the first fixing portion comprises a cavity, and the cavity is configured to accommodate a part of the flexible electrical connection member;
   wherein the first fixing portion is provided with a hook; the battery module is wrapped by a cable tie, and the hook is insertedly connected to the cable tie; or an end plate is arranged at the end of the battery module in the length direction, and the hook is inserted and connected to the end plate.

2. The battery pack according to claim 1, wherein the fixing member is arranged on the outside of the flexible electrical connection member in a first height direction and on an outside of the output electrode in the length direction.

3. The battery pack according to claim 1, wherein the first fixing portion comprises a first hooking portion and a second hooking portion, and the first hooking portion snappedly engages with the second hooking portion.

4. The battery pack according to claim 1, wherein the fixing member further comprises a second fixing portion connected to the first fixing portion;
   first baffles are respectively arranged below two sides of the second fixing portion in a width direction, and the first baffles are arranged on an outside of the output electrode in the width direction.

5. The battery pack according to claim 4, wherein a second baffle is connected to ends of the two first baffles in the length direction;
   an accommodating cavity is enclosed by the first baffles and the second baffle, and the accommodating cavity is arranged above the output electrode in the length direction.

6. The battery pack according to claim 4, wherein the fixing member further comprises a third fixing portion, and the third fixing portion is connected to each of the first fixing portion and the second fixing portion;
   the third fixing portion is arranged on an outside of an end of the flexible electrical connection member in the first height direction and on an outside of an end of the output electrode in the length direction.

7. The battery pack according to claim 6, wherein the third fixing portion comprises a curved portion, or
   the third fixing portion comprises a flat portion and a curved portion.

8. The battery pack according to claim 6, wherein the first fixing portion, the second fixing portion and the third fixing portion are integrally formed by injection molding.

9. A vehicle, comprising the battery pack according to claim 1.

10. The vehicle according to claim 9, wherein the fixing member is arranged on the outside of the flexible electrical connection member in a first height direction and on an outside of the output electrode in the length direction.

11. The vehicle according to claim 9, wherein the first fixing portion comprises a first hooking portion and a second hooking portion, and the first hooking portion snappedly engages with the second hooking portion.

12. The vehicle according to claim 9, wherein the fixing member further comprises a second fixing portion connected to the first fixing portion;
   first baffles are respectively arranged below two sides of the second fixing portion in a width direction, and the first baffles are arranged on an outside of the output electrode in the width direction.

13. The vehicle according to claim 12, wherein a second baffle is connected to ends of the two first baffles in the length direction;

an accommodating cavity is enclosed by the first baffles and the second baffle, and the accommodating cavity is arranged above the output electrode in the length direction.

14. The vehicle according to claim 12, wherein the fixing member further comprises a third fixing portion, and the third fixing portion is connected to each of the first fixing portion and the second fixing portion;

the third fixing portion is arranged on an outside of an end of the flexible electrical connection member in the first height direction and on an outside of an end of the output electrode in the length direction.

15. The vehicle according to claim 14, wherein the third fixing portion comprises a curved portion, or the third fixing portion comprises a flat portion and a curved portion.

16. The vehicle according to claim 14, wherein the first fixing portion, the second fixing portion and the third fixing portion are integrally formed by injection molding.

\* \* \* \* \*